United States Patent [19]

Vetter

[11] 4,211,525
[45] Jul. 8, 1980

[54] APPARATUS FOR MAKING STRETCHED, HOLLOW SHAPED STRANDS HAVING CORRUGATED INTERMEDIATE SUPPORTS

[75] Inventor: Heinz Vetter, Rossdorf, Fed. Rep. of Germany

[73] Assignee: Röhm GmbH, Darmstadt, Fed. Rep. of Germany

[21] Appl. No.: 966,738

[22] Filed: Dec. 5, 1978

[51] Int. Cl.² .................... B29C 17/07; B29D 23/03; B29F 3/012
[52] U.S. Cl. .................... 425/326.1; 264/566; 264/568; 264/167; 425/376 A; 425/376 B; 425/465
[58] Field of Search ............ 425/326.1, 376 A, 376 B, 425/465; 264/566, 568, 167

[56] References Cited

U.S. PATENT DOCUMENTS 3,929,951 12/1975 Shibata et al. .................... 264/566

FOREIGN PATENT DOCUMENTS 2050969 4/1971 Fed. Rep. of Germany.
457829 8/1968 Switzerland.

Primary Examiner—Jan H. Silbaugh
Attorney, Agent, or Firm—Curtis, Morris & Safford

[57] ABSTRACT

What is disclosed is a method and apparatus for forming a radially expanded and stretched tube of synthetic resin having a plurality of longitudinal-support members, corrugated in the longitudinal tube direction, joined to and extending between two opposing tube walls, by extruding the tube such that that areas of the opposing walls extending between two adjacent support members comprise alternating thick and thin wall portions in the longitudinal direction and every thin portion has a laterally-adjacent thick wall portion, whereby on subsequent stretching and expansion, the thick and thin wall portions stretch disproportionately and deform the support members attached thereto unequally to effect their corrugation in the longitudinal direction.

4 Claims, 7 Drawing Figures

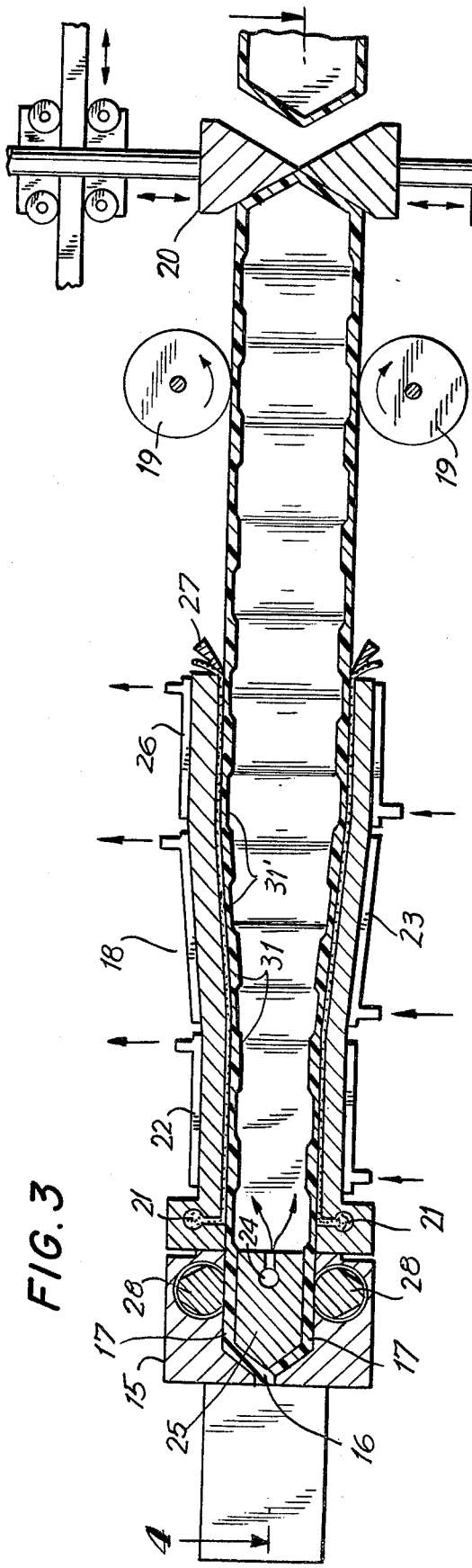
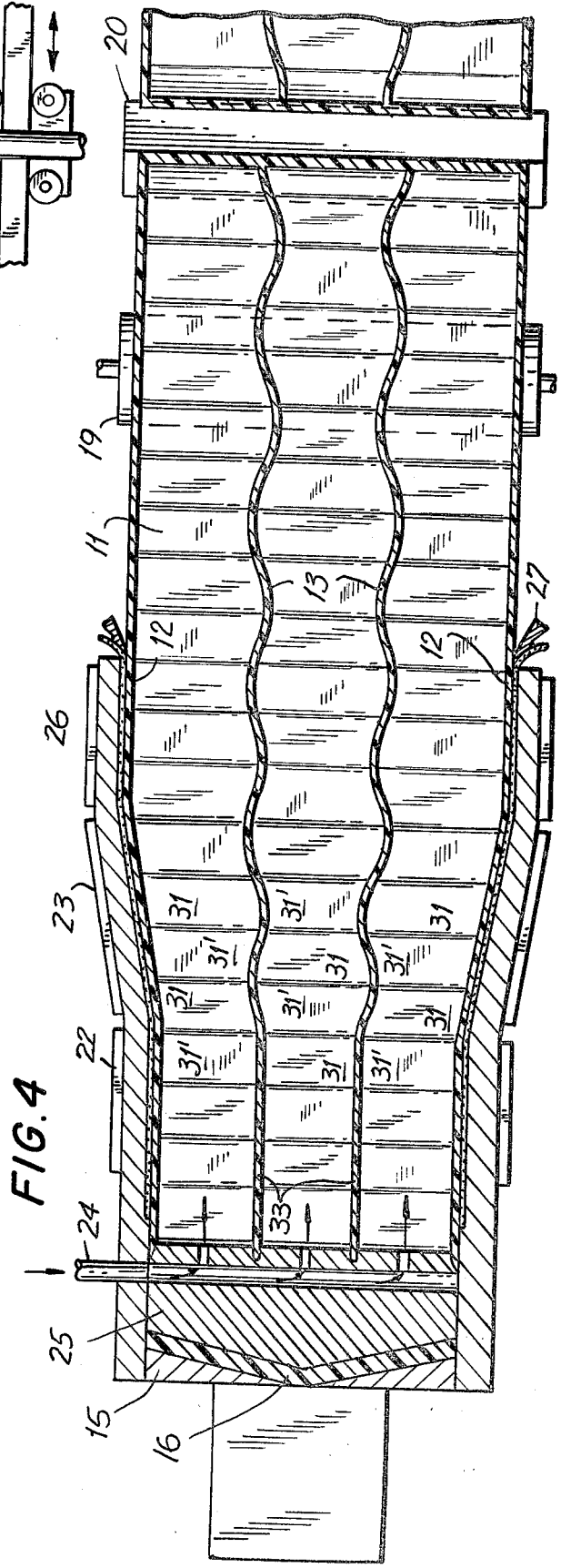
FIG. 3
FIG. 4

APPARATUS FOR MAKING STRETCHED, HOLLOW SHAPED STRANDS HAVING CORRUGATED INTERMEDIATE SUPPORTS

The present invention relates to methods for making stretched plastic tubes having corrugated support members therein.

German Offenlegungsschrift No. 2,536,462 published Feb. 24, 1977 (corresponding with U.S. Ser. No. 711,148 filed Aug. 3, 1976 and now abandoned and its pending continuation-in-part application Ser. No. 879,454 filed Feb. 21, 1978 and now abandoned) relates to a method for the preparation of stretched, shaped, tubes of non-circular cross-section from thermoplastic synthetic resins by the expansion of a corresponding non-circular, shaped, hollow tube of resin which is in a thermoelastic condition with the aid of a pressurized gas enclosed in the cavity of the shaped tube. In the method, the shaped tube passes through a calibration apparatus whose free cross-section increases in the direction of movement of the tube in proportion to the desired stretching and the expanded shaped tube is then cooled beneath the softening temperature after it has reached its final cross-section. The process can be used, for example to prepare a hollow shaped slab or sheet-like body having an upper layer, a lower layer, and supports arranged therebetween. In comparison with similarly constructed hollow bodies which, however, are not stretched, the hollow bodies prepared in the manner described above are distinguished by improved mechanical properties.

For the installation of such hollow shaped slabs across widely spaced supports, their resistance to denting is of significance. This stiffness or resistance to denting is increased by corrugation of the intermediate supports in the longitudinal direction.

Swiss Pat. No. 457,829 teaches a method for making such hollow shaped slabs having corrugated intermediate supports by a rhythmic sideways displacement of tangs, between which the intermediate supports are formed, within the mouth of an extrusion nozzle used to form the slabs. Although the supports within the interior region of the slab are in this way extruded in corrugated form and of uniform thickness, the supports at each edge are formed with a varying thickness, which results in a considerable consumption of material and creates tensions in the product. Further, the rhythmic displacement of the nozzle core having the tangs therein is technically complex.

German Offenlegungsschrift No. 2,050,969 also teaches the forming of a hollow shaped tube having a stretched upper layer and lower layer and corrugated supports arranged therebetween using a very complicated apparatus. First, two concentric circular hollow strands are extruded, of which the outer hollow strand has extensions therein directed radially inward. These extensions are formed with an annular core piece having radial slits. By a rhythmic turning motion of the slit core piece back and forth, the radial extensions of the outer hollow strand are formed to be corrugated in the longitudinal direction. After leaving the extrusion nozzle, the two concentric strands are expanded by compressed air in such a manner that the inner hollow strand abuts the radial extensions of the outer strand and welds thereto. After the necessary common expansion of the now-joined concentric tubes, these are slit open in the longitudinal direction and flattened out to form a planar hollow slab having an upper and lower layer and intermediate supports.

The present invention employs a corrugating process which is fundamentally different. In the process taught in the aforementioned German Offenlegungsschrift No. 2,536,462 and its United States counterpart, during the non-longitudinal or sideways stretching across the breadth of a slab-shaped tube having interval supports, the upper and lower belt-like layers of the hollow shaped structure are stretched uniformly across their breadth. This causes the points at which the internal supports are attached to the layers to spread apart from one another in proportion to the sideways stretching so that the original narrow hollow chambers defined in the slab structure are converted into correspondingly broader hollow chambers. The uniform increase in spacing of the supports is a result of the uniform elastic non-longitudinal stretching of the layer to which they are affixed. However, this sideways stretching is uniform only if the layer is of the same uniform thickness across its entire breadth. Even slight differences in the thickness of the layer have the effect that a slightly thinner zone is overproportionately stretched and a slightly thicker zone is less than proportionately stretched. The present invention makes use of this effect to achieve an intentional differentiation in the sideways stretching of the belt-like layers.

According to the invention, during extrusion of the hollow strand those areas of the strand walls which lie between the points of attachment of the supports are formed alternately thinner and thicker by a rhythmically changing increase and decrease of flow resistance in the corresponding nozzle sections and by correspondingly altering the flow resistance in adjacent nozzle sections in a contrary manner. Thus, both in the cross direction and in the longitudinal direction of the extruded hollow strand, thick-walled and thin-walled hollow chamber segments always alternate. Accordingly, the extruded hollow strand appears to have a checkerboard-like distribution of thick and thin zones.

The zone thickness of the belt-like upper and lower layers is influenced by the amount of molding compound introduced per unit time through the corresponding nozzle segment and this amount in turn depends on the flow resistance which opposes the forming compound in the material feed channel of the shaping apparatus. There are different methods by which this flow resistance can be rhythmically varied. For example, one can rhythmically narrow and broaden the free cross-sectional area, for example by letting a slowly-rotating non-circular disc dip to varying depths into the feed channel for the forming mass. The non-circular disc in each case extends across the entire breadth of a nozzle segment. One can also permit other constrictions or barriers to dip rhythmically into the feed channel or to be introduced in a blocking position. Further, flow resistance can be influenced by the temperature of the forming mass. By rhythmic cooling and reheating of a nozzle segment, the amount flowing therethrough can be reduced or increased. Finally, flow velocity can be decreased by rolls extending into the channel containing the forming mass, which rolls turn contrary to the direction of flow; the rate of flow can again be increased by a reversal of the direction of rotation or by stopping the rolls.

In every case it is important that the flow resistance in adjacent nozzle segments is correspondingly alternated in an opposite sense. A nozzle segment with a high flow resistance is in each case adjacent to two nozzle segments with decreased flow resistance, and vice versa. The intermediate internal supports are correspondingly formed at the seam point of two nozzle segments.

The hollow strand formed in this way, now in a thermoelastic condition, enters the stretching zone of the calibration arrangement where it is stretched in three dimensions. As a result of the non-uniform thickness of the upper and lower belt-like layers, the thick zones therein are more weakly stretched during stretching than are the thin zones, with the result that the points of attachment of the internal intermediate supports on the face of a thick layer zone are less further separated from each other than are those on the face of a thin layer zone. Accordingly, alternating hollow chambers of differing breadth are created. Since, however, the chambers have outer walls of a thickness differing also in the longitudinal direction, they are converted into broader and narrower hollow chambers in an alternating rhythmic fashion. In this way, a corrugated development of the intermediate supports is brought about.

A better understanding of the present invention and of its many advantages will be had by referring to the accompanying drawings wherein:

FIG. 3 is a side view, in section, of an apparatus suitable for preparing a radially-expanded and longitudinally-stretched synthetic resin tube of the kind shown in FIGS. 1 and 2;

FIG. 4 is a plan view, in section, of the apparatus of FIG. 3 taken along lines 4—4 of FIG. 3;

Figure 1:
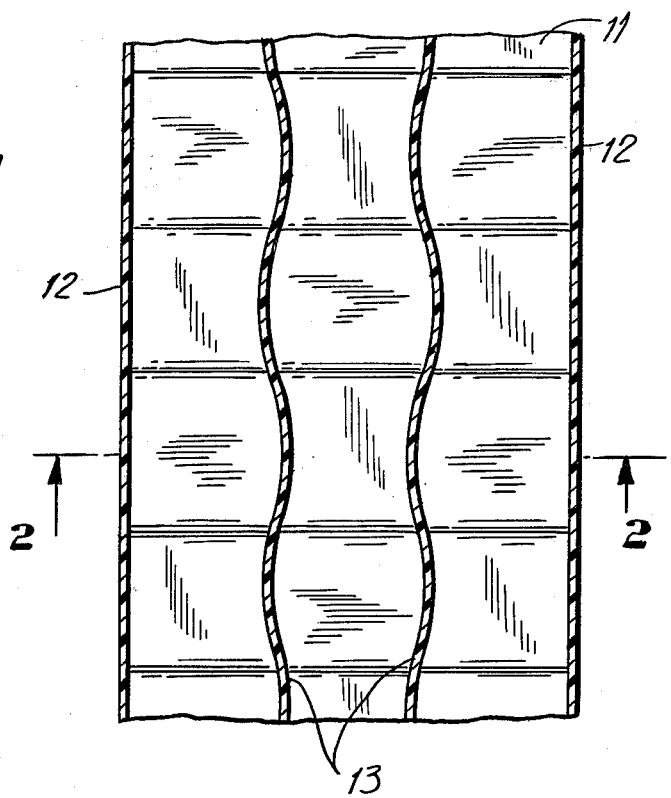
FIG. 1 is a plan view, in cross-section, of a hollow, non-circular, radially-expanded, longitudinally-stretched, synthetic resin tube having corrugated interior support walls of a kind which can be produced according to the present invention.

More in particular, FIG. 1 shows a hollow, non-circular tube of radially-expanded and longitudinally-stretched thermoplastic synthetic resin comprising a first outer wall 11, substantially planar outside support walls 12, and a plurality of interior support walls 13 corrugated in the longitudinal direction of the tube.

Figure 2:
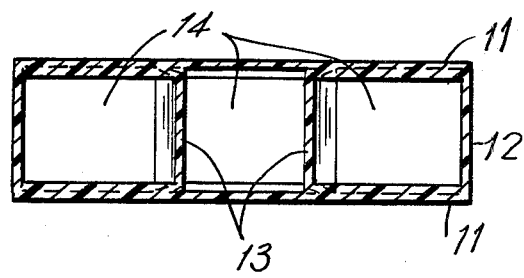
FIG. 2 is a front view of such a tube taken along line 2—2 of FIG. 1.

FIG. 2 similarly shows a tube having substantially parallel outer walls 11, outer supports walls 12 extending therebetween and joined to walls 11, and plurality 13 of corrugated interior support walls also extending between walls 11 and joined thereto and extending longitudinally along the tube to define a plurality of hollow cavities 14 therein.

FIG. 3 is a side view, in section, of an apparatus suitable for preparing a tube such as is shown in FIGS. 1 and 2. The apparatus comprises extrusion means 15 for extruding molten thermoplastic resin 16 through substantially parallel upper and lower channels 17 to form what will eventually correspond with parallel outer walls 11 of the structure of FIGS. 1 and 2. The apparatus of FIG. 3 further includes temperature-controlled forming or calibration apparatus 18, draw-off means such as draw-off rolls 19, and cutting and sealing means, shown generally as 20, for cutting off selected lengths of the extruded hollow tube while simultaneously sealing the end thereof so that the tube is gas-tight.

As molten thermoplastic resin 16 leaves channels 17 and enters calibration apparatus 18, it is suitably coated with a thin film of lubricant applied through lubricating channels 21 to the exterior surfaces thereof. In a first zone 22 of calibration apparatus 18, the temperature of thermoplastic resin 16 is reduced until the resin is in a thermoelastic condition, suitably by temperature-controlling means such as a cooling jacket through which fluid of a chosen temperature is circulated. From zone 22, the resin now enters expansion zone 23 where, under the influence of compressed gas introduced through gas channel 24 of nozzle core 25, the plastic of the extruded tube is expanded against the walls of zone 23 of calibration apparatus 18 to assume its final dimensions. The speed of draw-off rolls 19 with respect to the speed of extrusion is such that the plastic is simultaneously longitudinally stretched in zone 23, as well as being radially expanded. As well known in the art, this longitudinal and radial stretching of a thermoplastic resin while in a thermoelastic condition greatly enhances its mechanical and other properties in a desirable fashion. Finally, the now-expanded tube enters cooling zone 26 of calibration apparatus 18 where, again using temperature-controlled means, the plastic is cooled beneath its softening point and rigidifies. Excess lubricant is conveniently removed by scraping means 27 and can be collected and recirculated through channels 21.

Figure 5:
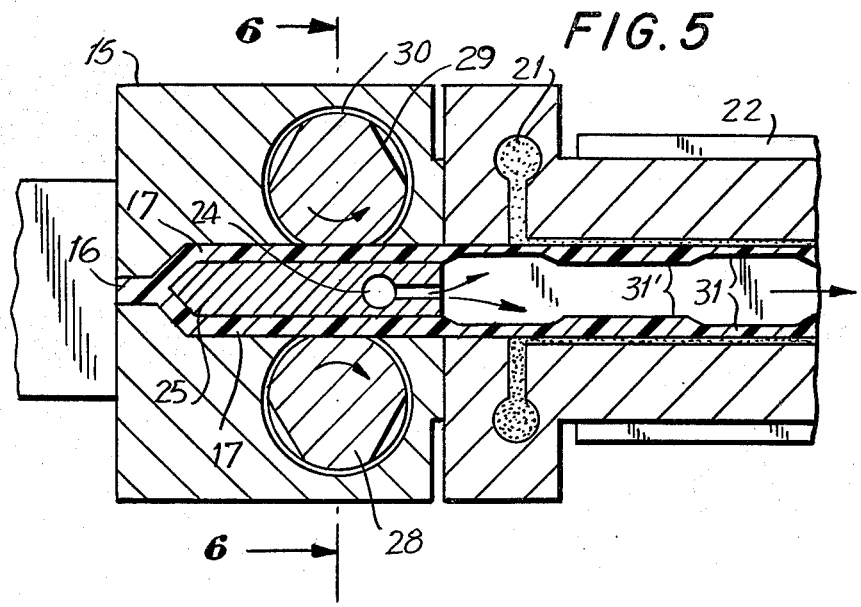
FIG. 5 is a side view, in section, showing in greater detail extrusion means suitable for extruding an unstretched synthetic resin tube which, on stretching, will assume the proportions of a tube such as is shown in FIGS. 1 and 2.

As shown in FIG. 3, and as shown in FIG. 5 in greater detail, extrusion means 15 comprises a pair of non-circular discs or cylinders which rotate within extrusion means 15 such that the height of channels 17, which form the upper and lower outer walls 11 of the final tubular structure, varies depending on the rotary position of discs 28 with respect to nozzle core 25, which forms a first wall defining channels 17 through which resin 16 flows. As discs 28 rotate rhythmically, the height of channels 17 alternately increases and decreases depending on whether flat portion 29 of disc 28 defines the second wall of the channels or whether rounded portion 30 of disc 28 defines the second wall of the channels (i.e. extends into channels 17 to decrease their height).

Accordingly, the substantially parallel outer walls of the extruded tube comprise portions 31 which are thin and alternate with portions 31' which are thick as the extruded tube enters expansion zone 22 of calibrating means 18.

Figure 6:
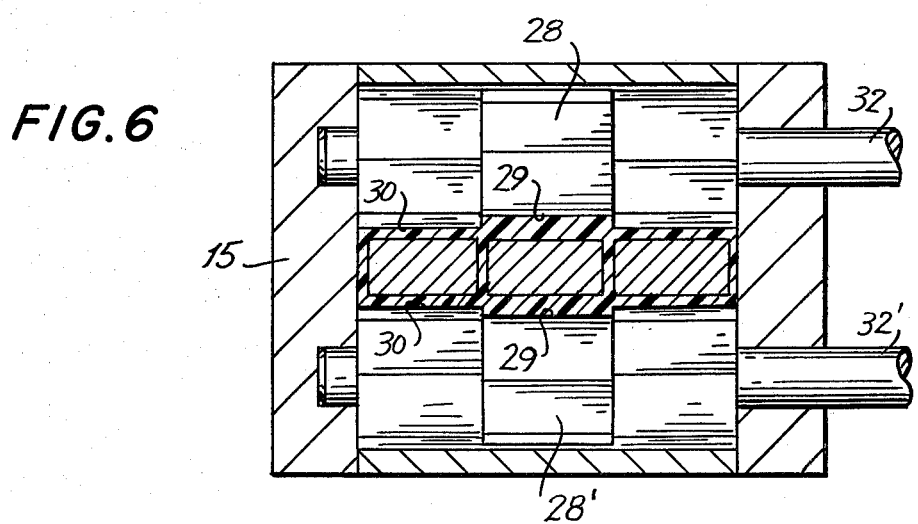
FIG. 6 is a plan view, in section, of the extrusion means of FIG. 5 taken along line 6—6 of FIG. 5.

Further, as will be clear from FIG. 6, extrusion means 15 comprise a plurality of adjacent rotating discs or cylinders 28 mounted on a common rotating shaft 32 and paired with a similar plurality of discs 28' on a paired shaft 32'. The position of the discs 28 along shaft 32 is such that channels 17 which form the substantially parallel outer walls 11 vary on extrusion not only longitudinally with respect to thin portions 31 and thick portions 31', but also have alternating thin and thick portions (31, 31') in a lateral direction, i.e. perpendicular to the longitude of the hollow tube. Discs 28 are mounted on shaft 32 such that any two adjacent discs alternatingly form either a thick portion 31' of the wall or a thin portion 31 thereof.

As is best seen from FIG. 4, the alternating thick zones 31' and thin zones 31 form a "checkerboard" pattern within extruded outer wall 11. As the extruded wall leaves temperature-controlled zone 22, where it is brought into a thermoelastic condition, and enters expansion and stretching zone 23, compressed gas introduced through line 24 forces the walls of the extruded hollow tube against the inner walls of stretching zone 23. Those portions 31 of outer wall 11 which are relatively thin stretch disproportionately more, both in the longitudinal and in the lateral direction, than do those portions 31' where the walls are relatively thicker. This differential stretching or expansion of the thick and thin portions of outer wall 11 causes deformation of the support walls 33, which are planar as they leave extruding means 15, causing them to assume the corrugated shape of walls 13 in the final tube.

Figure 7:
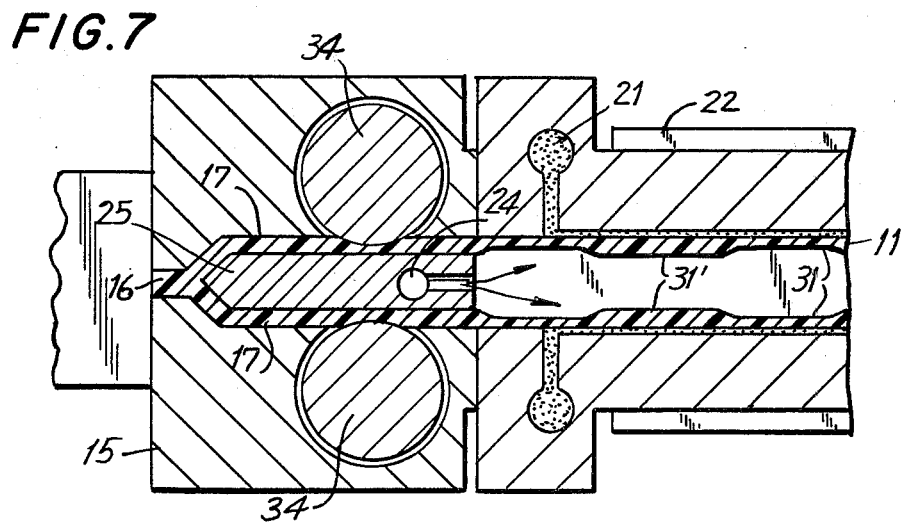
FIG. 7 is a side view, in section, of a still further embodiment of extrusion means suitable for extruding an unstretched synthetic resin tube which, on stretching, will resemble the tube of FIGS. 1 and 2.

Finally, FIG. 7 shows a further embodiment of extrusion means 15 suitable for creating such a "checkerboard" pattern of thick portions 31' and thin portions 31 in extruded outer wall 11. In this embodiment, circular discs, rolls, or cylinders 34 are present which define extrusion channels 17 between their surfaces and the surface of nozzle core 25. The circular discs 34 can be used in several ways to provide thick and thin portions (31', 31) in the extruded product. Thus, if discs or rolls 34 are motionless, they will define a channel 17 of dimensions which give a certain wall thickness. If the rolls are now rotated in the direction of plastic flow in channel 17, they will increase the volume of plastic flowing per unit time through the channel and will create a thicker wall portion than is created when the rolls are stationary. On the other hand, if the rolls are rotated in a direction opposite to the flow of plastic through channel 17, they will decrease the volume of plastic flowing per unit time through channel 17. Thus, by having the rolls stationary and then moving them in one direction or another relative to the flow of plastic through the channel, or by having the rolls constantly changing direction with respect to the flow of plastic through channel 17, a wall having alternating thick and thin portions can be extruded.

In still another embodiment, which can also be illustrated by reference to FIG. 7, rolls 34 are equipped with temperature-control means (not shown) whereby the temperature of the rolls, or at least of that portion extending into plastic channels 17, can be altered. If the temperature of the rolls is raised, reducing the viscosity of the plastic in channels 17, the volume of plastic flowing through the channels per unit time will be increased relative to the volume which flows through the same channels, of the same dimensions, but at a lower temperature at which the viscosity of the plastic is relatively higher. Thus, by alteration in the temperature of the circular rolls 34, again a "checkerboard" pattern of thick and thin portions can be created in the extruded wall. On expansion, then, the originally planar extruded support walls 33 become corrugated by differential expansion effects to form corrugated support wall 13.

What is claimed is:

1. Apparatus for making a hollow non-circular tube of a transversely expanded and longitudinally stretched synthetic resin, said tube having two opposing tube walls with a plurality of support members joined thereto and extending therebetween, said support members extending longitudinally through said tube and being corrugated in the longitudinal direction; which apparatus comprises extruding means including an extrusion nozzle for extruding a tube of unstretched resin in thermoplastic condition, said extrusion nozzle having a plurality of paired opposed extrusion channels for forming said two opposing tube walls by extrusion, adjacent pairs of said extrusion channels being separated laterally to form said support members by extrusion, and flow control means for rhythmically increasing and decreasing the resistance to flow of resin through each extrusion channel whereby the extruded thickness of the two opposing tube walls is alternately increased and decreased, said apparatus further comprising calibration means, directly adjacent said extrusion nozzle and into which the extruded tube is passed, said calibration means including temperature-adjusting means for adjusting the temperature of said extruded tube until the resin is in a thermoelastic condition, forming means for laterally expanding and longitudinally stretching the temperature-adjusted resin tube while in a thermoelastic condition whereby alternately thicker and thinner portions of the opposing tube walls are differently transversely stretched and said support members are deformed into a longitudinally-corrugated condition, said calibration means further including cooling means for cooling the expanded and stretched tube to a temperature below the softening point of the resin.

2. Apparatus as in claim 1 wherein said flow control means comprise a non-circular disc capable of rotating within said extrusion channel, whereby the height, and therewith the volume, of said channel can be rhythmically increased and decreased, and means for rotating said disc.

3. Apparatus as in claim 1 wherein said flow control means comprise a roller extending into said extrusion channel and capable of rhythmically rotating in the direction of resin flow through said channel or of rhythmically rotating counter to the direction of resin flow through said channel, whereby the velocity of flow through said channel can be rhythmically increased or decreased, and means for rotating said roller.

4. Apparatus as in claim 1 wherein said flow control means comprise means capable of increasing or decreasing the temperature of the resin flowing through an extrusion channel, whereby the viscosity and flow rate of said resin are capable of variation.

* * * * *